Patented Jan. 5, 1954

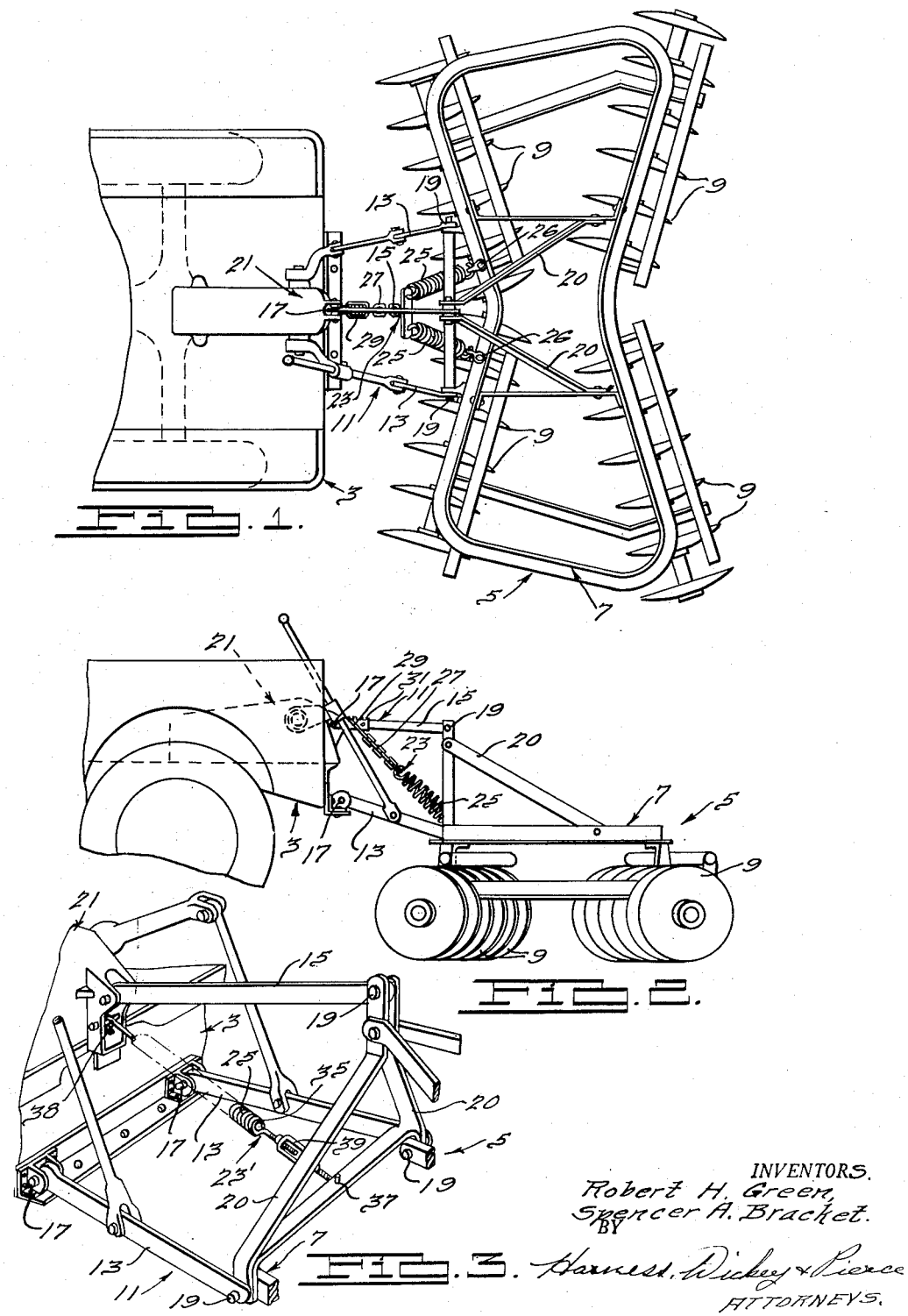

2,664,805

UNITED STATES PATENT OFFICE 2,664,805

RESILIENT SUSPENSION FOR FARM IMPLEMENTS

Robert Henry Green and Spencer Austin Brackett, Monroe, Mich., assignors to Monroe Auto Equipment Company, Monroe, Mich., a corporation of Michigan Application July 16, 1949, Serial No. 105,212

2 Claims. (Cl. 97—46.95)

This invention relates generally to a depth control device for farm implements having ground-engaging elements, and more particularly to a resilient suspension type of depth control device which is connected between a towing vehicle and the farm implement so as to control the depth of penetration of the implement ground-engaging elements with respect to the ground or soil.

Farm implements, such as disk harrows and the like, are generally pulled along the ground by a towing vehicle, through the medium of a lift or some other suitable hitch arrangement. When such an implement is working a relatively hard or firm soil it may be necessary to force the ground-engaging elements into the ground to a desired depth, either through the application of weights to the implement or by the application of a downward force, through a hydraulic lift or the like. However, when the implement is being pulled along relatively soft or sandy soil, the ground-engaging elements thereof may sink into the ground much deeper than is necessary or desirable, because of the weight of the implement itself. In such soil the use of a depth control wheel is not practical nor satisfactory because it likewise will tend to sink into the ground in the same manner as the ground-engaging elements. As the depth at which the ground engaging elements work the soil is important, both from a soil conditioning standpoint and from the standpoint of the load which is being pulled by the towing vehicle, it has been found desirable to provide means for preventing the ground-engaging elements of the implement from penetrating too deeply into the soil.

The primary object of this invention is, therefore, to provide a suitable depth control device for preventing the ground-engaging elements of an implement from penetrating too deeply into relatively loose soil. This is accomplished by connecting one or more spring or resilient elements between the implement, and either the vehicle proper or the upper link of a three-point hitch, which connects the implement to the vehicle in a conventional manner. With this arrangement the implement is resiliently supported on the vehicle and is in effect lifted relative to the ground, through the spring or resilient elements so as to prevent excessively deep penetration of the ground-engaging elements.

It is a further object of this invention to provide a resilient depth control device of the aforementioned type, which can either be adjusted itself or adjustably connected to the vehicle proper, or implement hitch, so as to vary the lifting force exerted on the implement and thereby vary the depth of penetration of the implement ground-engaging elements.

It is a still further object of this invention to provide an inexpensive, novel, efficient and durable device of the aforementioned type, which may be readily connected with the implement and vehicle or implement hitch, and which may be readily adjusted for the aforementioned purposes, in a simple and inexpensive manner.

These and other objects of this invention will become apparent from the following detailed description, taken in conjunction with the accompanying drawing, in which:

Figure 1 is a top plan view of a rigid type disk harrow connected to a towing vehicle through a three-point type implement hitch or lift and the device of this invention;

Figure 2 is a side elevational view of the structure illustrated in Figure 1; and Figure 3 is a fragmentary perspective of an implement connected to a towing vehicle through a three-point type hitch or lift, and a further embodiment of the device illustrated in Figure 1.

Referring now to the drawing, and more particularly to Figs. 1 and 2, it will be seen that a towing vehicle 3, of any suitable type, such as a conventional tractor, or a four-wheel drive "jeep" type vehicle, is provided for pulling a farm implement such as a rigid type disk harrow 5. A rigid type disk harrow is shown merely for purposes of illustration and it is to be distinctly understood that this invention is not limited to disk harrows or any other particular farm implement, but is designed for use with any suitable farm implement. The disk harrow 5 includes a frame 7 and a plurality of disk gangs 9, connected with the frame in any suitable manner. The harrow 5 may be connected with the towing vehicle 3 in any suitable manner, but is illustrated as being connected therewith by means of a three-point type of implement hitch or lift 11. The particular lift illustrated is of the type illustrated and described in the copending application of Charles Joseph Smith et al. for improvements in Implement Lift, Serial No. 8,444, filed February 14, 1948, but it will be appreciated that other types of three-point lifts or hitches may be employed.

The lift 11 includes a pair of laterally spaced lower tension links 13 and an upper compression link 15 which is spaced above the lower links 13, substantially midway therebetween. The front ends of the links 13 and 15 are universally connected to the vehicle 3 at 17, while the rear ends thereof are universally connected at 19 to an A frame portion 20 of the implement frame 7. Thus, a substantially parallelogram type linkage is provided for connecting the implement 5 to the vehicle 3, and the implement is free to move in a vertical direction relative to the vehicle. While a suitable hydraulically operated lift structure 21 may be provided for raising and lowering the lower lift links 13 so as to force the disk gangs 9 into the soil, if the soil is extremely hard, generally the links 13 are left free to move vertically when pulling an implement. Therefore, if the soil, which is being worked by the disk harrow, is extremely soft or sandy, the weight of the harrow may cause the disks 9 to sink into the soil much further than is necessary or desirable. It will be appreciated that if the disks sink too deeply into the soil, the implement will be very difficult to pull, and furthermore will cause improper working or conditioning of the soil.

In order to prevent overly deep penetration of the disks 9, a resilient type depth control device 23 is provided. The device 23 illustrated in Figs. 1 and 2 comprises a pair of laterally spaced coil tension springs 25, each of which has one end connected to the implement frame at 26. The forward ends of the springs 25 converge and are connected to a length of chain 27 by any suitable means. The free end of the chain 27 is provided with an eye portion 29 which is adjustably connected with a rack 31 on the upper implement hitch link 15. The strength and lift factors of the device 23 may be varied by adjusting the point of connection of the free end of the chain 27 along the rack 31. It will, of course, also be appreciated that the free end of the chain could be connected directly to the towing vehicle 3, in the vicinity of the upper link 15, without departing from the scope of the invention. The device 23, therefore, resiliently suspends the implement from the towing vehicle, so that the full weight of the implement is not applied to the soil and so that the depth of penetration of the disks 9 can be readily varied and controlled by adjusting the front end of the device 23 along the rack 31. Thus, the lifting force on the implement can be varied so that the depth of penetration of the disks 9 can be properly controlled in accordance with the texture of the soil which is being worked.

In the embodiment illustrated in Fig. 3 of the invention, the device 23' includes a single coil tension spring 35, which has its lower end connected to the harrow frame at 37 and its upper end connected to the towing vehicle 3 at 38, adjacent to the upper hitch link 15. A turn buckle 39 is provided between the spring 35 and the implement connection 37, so that the lifting force exerted by the device 23 on the implement can be varied for the same reasons as set forth in connection with the previous embodiment, wherein the point of connection of the chain to the rack was varied in order to alter the depth of penetration of the implement ground-engaging elements.

It will thus be seen that the device of this invention provides a simple, efficient and accurate means for controlling the depth of penetration of the ground-engaging elements of a farm implement and permits the depth of penetration to be readily varied in accordance with the desires of the user and the type of soil which is being worked.

What is claimed is:

1. In combination an implement towing vehicle, an implement having ground engaging elements, three-point hitch means pivotally connecting the implement to the vehicle and including upper and lower links, a pair of laterally spaced tension spring members connected at one end to said implement, and means adjustably connecting the opposite ends of said spring members to the upper link of said hitch means so as to resiliently support said implement and said vehicle and thereby control the depth of soil penetration of the implement ground-engaging element.

2. A depth control device for use with an agricultural implement having ground-engaging elements, and connected with a towing vehicle through a three-point type hitch means including upper and lower links, said device including a pair of laterally spaced tension spring members connectable at one end to said implement, adjacent the lower links, and means connected with the opposite ends of said spring members for adjustably connecting the same to the upper link of the hitch means.

ROBERT HENRY GREEN.
SPENCER AUSTIN BRACKETT.

References Cited in the file of this patent

UNITED STATES PATENTS

| Number | Name | Date |
|---|---|---|
| 1,464,130 | Ferguson | Aug. 7, 1923 |
| 2,247,534 | Von Schlegell | July 1, 1941 |
| 2,398,147 | McKay | Apr. 9, 1946 |
| 2,398,365 | Ellis | Apr. 16, 1946 |
| 2,413,807 | Warne | Jan. 7, 1947 |
| 2,423,731 | Schiefelbein | July 7, 1947 |
| 2,438,553 | Fraga | Mar. 30, 1948 |
| 2,439,607 | Irwin | Apr. 13, 1948 |
| 2,445,145 | Love | July 13, 1948 |

FOREIGN PATENTS

| Number | Country | Date |
|---|---|---|
| 602,887 | Great Britain | June 4, 1948 |